（12）United States Patent
Chen et al.

(10) Patent No.: US 10,755,392 B2
(45) Date of Patent: Aug. 25, 2020

(54) HIGH-DYNAMIC-RANGE VIDEO TONE MAPPING

(71) Applicant: MEDIATEK INC., Hsin-Chu (TW)

(72) Inventors: Ying-Ru Chen, Hsinchu (TW); Wen-Fu Lee, Taichung (TW); Te-Hao Chang, Taipei (TW); Tai-Hsiang Huang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 242 days.

(21) Appl. No.: 15/991,711

(22) Filed: May 29, 2018

(65) Prior Publication Data

US 2019/0019277 A1 Jan. 17, 2019

Related U.S. Application Data

(60) Provisional application No. 62/531,909, filed on Jul. 13, 2017.

(51) Int. Cl.
*G06T 5/00* (2006.01)
*G06T 5/40* (2006.01)
(Continued)

(52) U.S. Cl.
CPC ............... *G06T 5/009* (2013.01); *G06T 5/40* (2013.01); *H04N 5/202* (2013.01); *H04N 5/57* (2013.01); *H04N 7/0117* (2013.01); *H04N 9/69* (2013.01); *G06T 2207/20208* (2013.01); *H04N 5/2355* (2013.01)

(58) Field of Classification Search
CPC .. G06T 5/009; G06T 5/40; G06T 5/00; G06T 2207/10024; H04N 5/202; H04N 5/57; H04N 7/0117; H04N 9/69; G09G 2340/06; G09G 2320/0673; G09G 2320/0666;
(Continued)

(56) References Cited

U.S. PATENT DOCUMENTS 8,248,486 B1 * 8/2012 Ward .................. H04N 1/4072
348/223.1
10,360,875 B2 7/2019 Kang et al.
(Continued)

FOREIGN PATENT DOCUMENTS

CN 107431808 A 12/2017
TW 201814684 A 4/2018

*Primary Examiner* — Michael S Osinski
(74) *Attorney, Agent, or Firm* — McClure, Qualey & Rodack, LLP

(57) ABSTRACT

A video controller and method for performing tone-mapping of high-dynamic-range (HDR) video are provided. The video controller includes: a color-space converter, arranged to receive an input high-dynamic-range (HDR) video signal and perform a color space conversion on the input HDR video signal to obtain a first video signal having a first gamma curve; a de-gamma unit, arranged to apply a second gamma curve on the first video signal to compensate the first gamma curve to obtain a second video signal; a first histogram calculator, arranged to calculate a first histogram of a current frame of the second video signal; and a tone-mapping unit, arranged to apply a tone-mapping curve on the current frame of the second video signal according to a histogram of a previous frame of the second video signal to generate an output video signal.

22 Claims, 4 Drawing Sheets

(51) Int. Cl.
  *H04N 5/57* (2006.01)
  *H04N 7/01* (2006.01)
  *H04N 9/69* (2006.01)
  *H04N 5/202* (2006.01)
  *H04N 5/235* (2006.01)

(58) Field of Classification Search
  CPC ... G09G 2320/0276; G09G 2320/0242; G06K 9/4652; G06K 9/4661
  See application file for complete search history.

(56) References Cited

U.S. PATENT DOCUMENTS

| | | | |
|---|---|---|---|
| 10,469,849 B2* | 11/2019 | Agostinelli | H04N 19/186 |
| 2005/0206979 A1* | 9/2005 | Tomizawa | G09G 5/02 |
| | | | 358/518 |
| 2006/0256054 A1* | 11/2006 | Baek | G09G 3/2003 |
| | | | 345/88 |
| 2006/0284805 A1* | 12/2006 | Baek | G09G 3/3607 |
| | | | 345/88 |
| 2007/0052633 A1* | 3/2007 | Sato | G09G 3/006 |
| | | | 345/76 |
| 2007/0132866 A1* | 6/2007 | Lee | H04N 9/045 |
| | | | 348/254 |
| 2009/0102769 A1* | 4/2009 | Kouno | G09G 3/3648 |
| | | | 345/88 |
| 2010/0085361 A1* | 4/2010 | Kim | G06T 5/008 |
| | | | 345/428 |
| 2010/0157161 A1* | 6/2010 | Tanahashi | H04N 5/202 |
| | | | 348/675 |
| 2010/0231759 A1* | 9/2010 | Tsutsumi | H04N 5/23203 |
| | | | 348/242 |
| 2011/0194129 A1* | 8/2011 | Fujiwara | H04N 1/56 |
| | | | 358/1.9 |
| 2011/0229019 A1* | 9/2011 | Batur | H04N 5/217 |
| | | | 382/159 |
| 2012/0147065 A1* | 6/2012 | Byun | G09G 3/3208 |
| | | | 345/690 |
| 2012/0236020 A1* | 9/2012 | Paris | G06T 5/009 |
| | | | 345/589 |
| 2013/0076803 A1* | 3/2013 | Lee | G09G 3/3233 |
| | | | 345/690 |
| 2015/0154903 A1* | 6/2015 | Miura | G09G 3/2003 |
| | | | 345/690 |
| 2015/0228215 A1* | 8/2015 | Nose | G09G 5/06 |
| | | | 345/590 |
| 2016/0028920 A1* | 1/2016 | Hashimoto | H04N 1/405 |
| | | | 358/534 |
| 2016/0189399 A1* | 6/2016 | Liu | G09G 5/02 |
| | | | 345/591 |
| 2016/0307540 A1* | 10/2016 | Holland | G09G 5/026 |
| 2016/0379555 A1* | 12/2016 | Kim | G09G 3/3291 |
| | | | 345/691 |
| 2017/0140736 A1* | 5/2017 | Croxford | G06T 1/60 |
| 2017/0310851 A1* | 10/2017 | Dobashi | H04N 1/4051 |
| 2017/0310981 A1 | 10/2017 | Agostinelli | |
| 2017/0324887 A1* | 11/2017 | Min | H04N 5/93 |
| 2018/0013920 A1* | 1/2018 | Dobashi | H04N 1/58 |
| 2018/0139429 A1* | 5/2018 | Park | G09G 5/005 |
| 2019/0068841 A1* | 2/2019 | Lakemond | H04N 1/6005 |
| 2019/0139201 A1* | 5/2019 | Eto | G06T 5/009 |
| 2019/0149693 A1* | 5/2019 | Cao | H04N 1/60 |
| 2019/0208218 A1* | 7/2019 | Agostinelli | H04N 19/103 |
| 2019/0279340 A1* | 9/2019 | Fujiwara | G06T 7/90 |
| 2020/0013198 A1* | 1/2020 | Endo | G09G 5/02 |
| 2020/0077067 A1* | 3/2020 | Hata | H04N 9/646 |

* cited by examiner

HIGH-DYNAMIC-RANGE VIDEO TONE MAPPING

CROSS REFERENCE TO RELATED APPLICATIONS

This application claims the benefit of U.S. Provisional Application No. 62/531,909 filed on Jul. 13, 2017, the entirety of which is incorporated by reference herein.

BACKGROUND OF THE INVENTION

Field of the Invention

The invention relates to video processing, and, in particular, to a video controller and a method for performing tone-mapping of high-dynamic-range (HDR) video.

Description of the Related Art

High Dynamic Range (HDR) is a new technology being introduced by a number of standard organizations (e.g., Blu-ray Disc Association, ISO/IEC HEVC, ITU-R, SMPTE, CEA, and HDMI) and private companies (e.g., Dolby, Philips). New devices such as ultra-high-definition (UHD) Blu-ray disc players and UHD TVs are expected to support HDR technologies in the near future.

The requirements to playback HDR videos include two main use case scenarios such as: 1) Playback of HDR videos on HDR display monitors or TVs; and 2) Playback of HDR videos on legacy Standard Dynamic Range (SDR) display monitors or TVs. The second use case requires converting the HDR videos to SDR videos. However, conventional HDR-to-SDR techniques may use static tone-mapping, such as using static metadata defined in ST. 2086 standard. Although static tone-mapping may have a better contrast in the dark regions in the image, it also makes the bright regions in the image saturated.

When the static metadata is available in the HDR videos, the conventional HDR-to-SDR techniques cannot adaptively change the tone-mapping curve frame by frame (i.e., a different tone-mapping curve for each frame in the video stream), resulting in poor video quality.

Accordingly, there is a need for a video controller and a method for performing tone-mapping of high-dynamic-range (HDR) video to solve the aforementioned problem.

BRIEF SUMMARY OF THE INVENTION

A detailed description is given in the following embodiments with reference to the accompanying drawings.

In an exemplary embodiment, a video controller is provided. The video controller includes: a color-space converter, arranged to receive an input high-dynamic-range (HDR) video signal and perform a color space conversion on the input HDR video signal to obtain a first video signal having a first gamma curve; a de-gamma unit, arranged to apply a second gamma curve on the first video signal to compensate the first gamma curve to obtain a second video signal; a first histogram calculator, arranged to calculate a first histogram of a current frame of the second video signal; and a tone-mapping unit, arranged to apply a tone-mapping curve on the current frame of the second video signal according to a histogram of a previous frame of the second video signal to generate an output video signal.

In another exemplary embodiment, a method for performing tone-mapping of high-dynamic-range (HDR) video is provided. The method includes the following steps: receiving an input high-dynamic-range (HDR) video signal; performing YUV to RGB conversion on the input HDR video signal to obtain a first RGB video signal having a first gamma curve; applying a second gamma curve on the first RGB video signal to compensate the first gamma curve to obtain a linear RGB video signal; calculating a first histogram of a current frame of the linear RGB video signal; and applying a tone-mapping curve on the current frame of the linear RGB video signal according to a histogram of a previous frame of the linear RGB video signal to generate an output linear RGB video signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
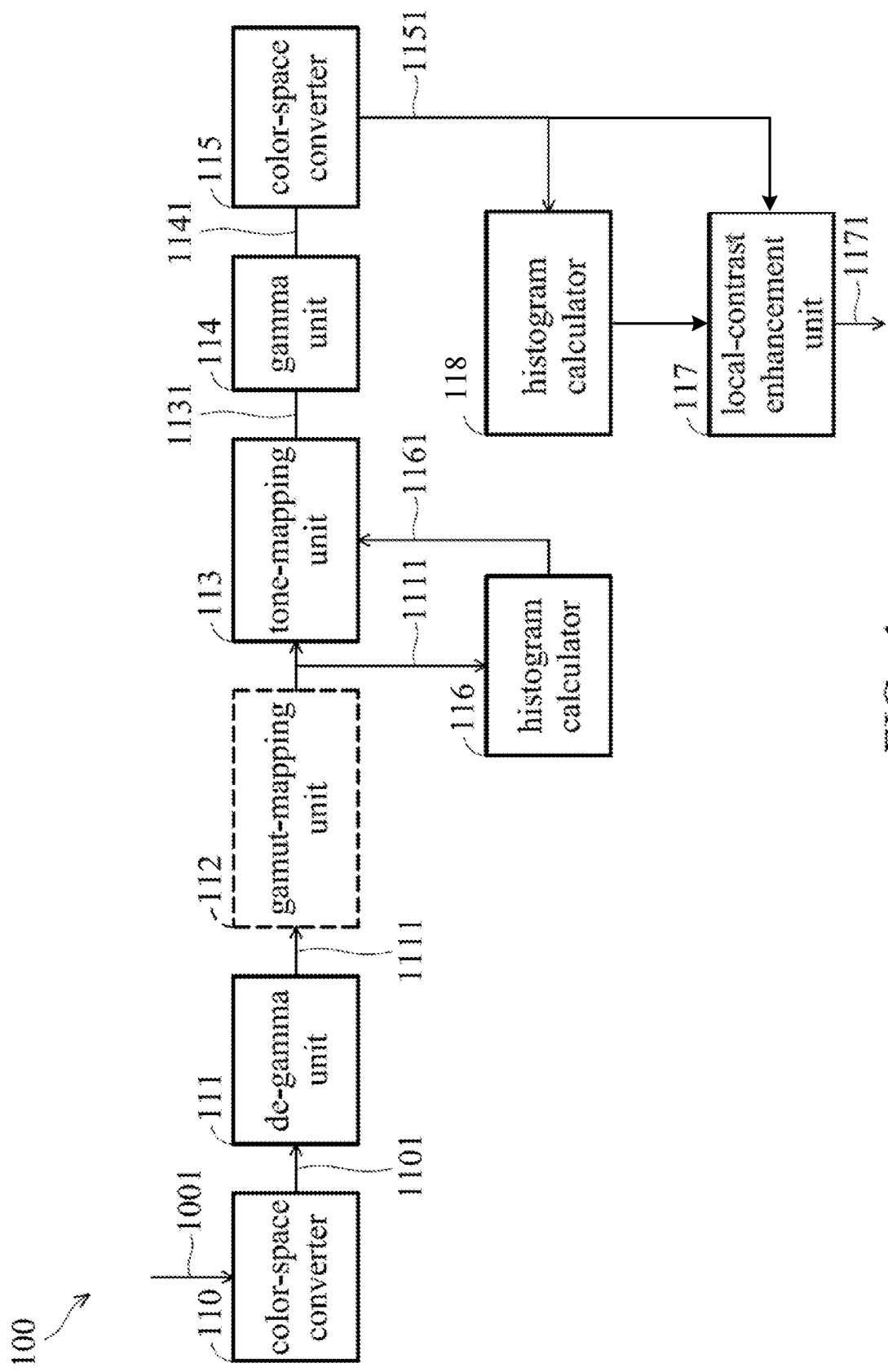
FIG. 1 is a block diagram of a video controller in accordance with an embodiment of the invention.

FIG. 1 is a block diagram of a video controller in accordance with an embodiment of the invention. As shown in FIG. 1, the video controller 100 includes a color-space converter 110, a de-gamma unit 111, a gamut mapping unit 112, a tone-mapping unit 113, a gamma unit 114, a color-space converter 115, a histogram calculator 116, a local-contrast enhancement unit 117, and a histogram calculator 118. The video controller 100 can be electrically connected to a display panel (not shown) via a multimedia transmission interface such as high-definition multimedia interface (HDMI) version 2.0 A or above, and the display panel may display the output linear RGB video signal from the video controller 100.

The color-space converter 110 is arranged to perform a color space conversion (e.g. YUV to RGB conversion) on an input HDR video signal (or video signal) 1001 to obtain a first RGB video signal 1101. The input HDR video signal 1001 may be an HDR YUV signal which is a linear RGB video signal. The input HDR video signal 1001 may be from an electronic device with or with a display panel. For example, the input HDR video signal 1001 may be from a TV, a smartphone, or a tablet PC that is equipped with a display panel. Alternatively, the input HDR video signal 1001 may be from a network video stream or an electronic device such as a Blu-Ray player, a set-top box, or a video game console without a display panel. Specifically, after the YUV to RGB conversion, a first gamma curve will be applied on the input HDR video signal 1001, and thus a non-linear RGB video signal in the RGB format (i.e., the first RGB video signal 1101) is obtained. In some embodiments, the input HDR video signal 1001 may be from a video signal that complies with the SMPTE (Society of Motion Picture & Television Engineers) ST2084 or ST 2086 standards.

The de-gamma unit 111 is arranged to de-gamma the first RGB video signal 1101 to obtain a linear RGB video signal 1111. More specifically, the de-gamma unit 111 applies a second gamma curve to compensate the first gamma curve that is included in the first RGB video signal 1101. As such, the gamma-compensated first RGB video signal (i.e., the linear RGB video signal 1111) can be have a linear property.

The gamut-mapping unit 112 is arranged to map a first gamut of the linear RGB video signal 1111 to a second gamut. For example, the first gamut (e.g., color space) for ultra-high-definition television (UHDTV) may be defined by the ITU-R BT.2020 standard, and the second gamut for the HDTV may be defined by the ITU-R BT.709 standard, and the first gamut for UHDTV is wider than the second gamut for the HDTV. If an UHDTV video signal is to be played on a HDTV display panel, the wider gamut (e.g., the first gamut) of the video signal for the UHDTV should be mapped into a smaller gamut (e.g., the second gamut) for the HDTV. In some embodiments, the gamut-mapping unit 112 can be omitted.

It should be noted that the linear RGB video signal 1111 from the de-gamma unit 111 or the gamut-mapping unit 112 is an absolute luminance signal that can expressed in units of candelas per meter squared ($cd/m^2$, or "nits").

The histogram calculator 116 may receive the linear RGB video signal 1111 from the de-gamma unit 111 or the gamut-mapping unit 112, and calculate the histogram of the linear RGB video signal 1111 by each frame. In particular, the calculated histogram 1161 records the statistics of the absolute luminance values of each pixel in the previous frame (e.g., t=n−1), and is fed to the tone-mapping unit 113. For an UHDTV video signal, it may take a huge amount of operations to calculate the histogram of a video signal having a 4K resolution. Thus, the histogram calculator 116 can be implemented by a dedicated logic circuit rather than the digital signal processor (DSP). In the embodiments, the histogram calculator 116 can be regarded as an absolute-luminance histogram calculator.

The tone-mapping unit 113 is configured to perform tone mapping on the linear RGB video signal 1111 having a first dynamic range (i.e., high dynamic range) to generate an output linear RGB video signal 1131 having a second dynamic range (i.e., standard dynamic range (SDR), or low dynamic range (LDR)) according to the calculated histogram 1161 of the previous frame (i.e., t=n−1), wherein the first dynamic range is wider than the second dynamic range. More specifically, the tone-mapping 113 may apply a tone-mapping curve (i.e., t=n) on the HDR content to convert the HDR content of the current frame to SDR content according to the calculated histogram 1161 of the previous frame (i.e., t=n−1). The SDR content such as images or videos may have a conventional gamma curve that was designed based on the limited of the cathode ray tube (CRT) which allows for a maximum luminance of 100 $cd/m^2$. Details of the tone-mapping algorithm used by the tone-mapping unit 113 will be described later.

The gamma unit 114 is configured to apply a third gamma curve to the output linear RGB video signal 1131 from the tone-mapping unit 113 to generate a second RGB video signal 1141. For example, the third gamma curve may be regarded as a display panel gamma curve or an encoded gamma curve that is designed for an ordinary display panel having standard dynamic range.

The color-space converter 115 is configured to perform a color space conversion (e.g. RGB to YUV conversion) on the second RGB video signal 1141 to obtain an SDR video signal 1151 that is further fed into the local-contrast enhancement unit 117 and the histogram calculator 118.

The histogram calculator 118 is configured to calculate histograms of various regions in each frame of the SDR video signal 1151. The histogram calculated by the histogram calculator 118 is based on the luminance values (i.e., Y values) of each pixel in each frame of the SDR video signal 1151. In the embodiments, the histogram calculator 118 can be regarded as a relative-luminance histogram calculator.

The local-contrast enhancement unit 117 is configured to enhance the local contrasts of various regions of the SDR video signal 1151 based on the calculated histograms from the histogram calculator 118 to generate an output SDR video signal 1171. For example, each frame in the SDR video signal 1151 can be divided into a plurality of regions, and the histogram calculator 118 may calculate the histogram of each region in each frame. Based on the calculated histogram of each region in each frame, the local-contrast enhancement unit 117 may determine the dark regions and the bright regions in each frame. Then, the local-contrast enhancement unit 117 may apply stronger contrast enhancement in dark regions and apply little contrast enhancement in bright regions. Thus, more details in the bright regions can be obtained, and the contrasts in dark regions can be improved.

In an embodiment, the components 110~118 of the video controller 100 may be implemented by an integrated circuit, a system-on-chip, or logic circuits, but the invention is not limited thereto. In an alternative embodiment, most components of the video controller 100, except the histogram calculators 116 and 118, may be implemented by a processor such as a general-purpose processor, a digital signal processor, or a video signal processor, but the invention is not limited thereto. Due to huge amounts of operations for calculating histograms, the histogram calculators 116 and 118 are preferably implemented by a dedicated logic circuit.

Figure 2A:
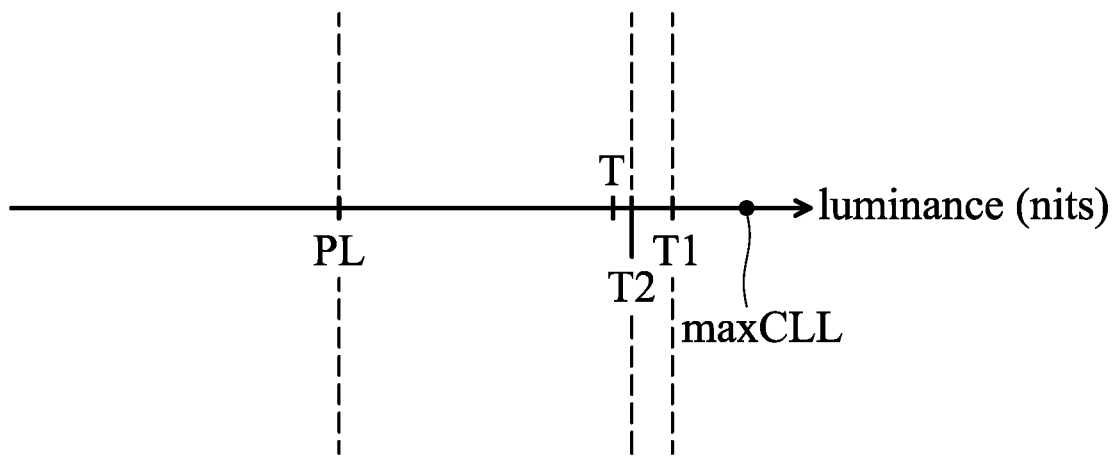
FIGS. 2A and 2B are examples of dynamic tone-mapping in accordance with an embodiment of the invention.
Figure 2B:
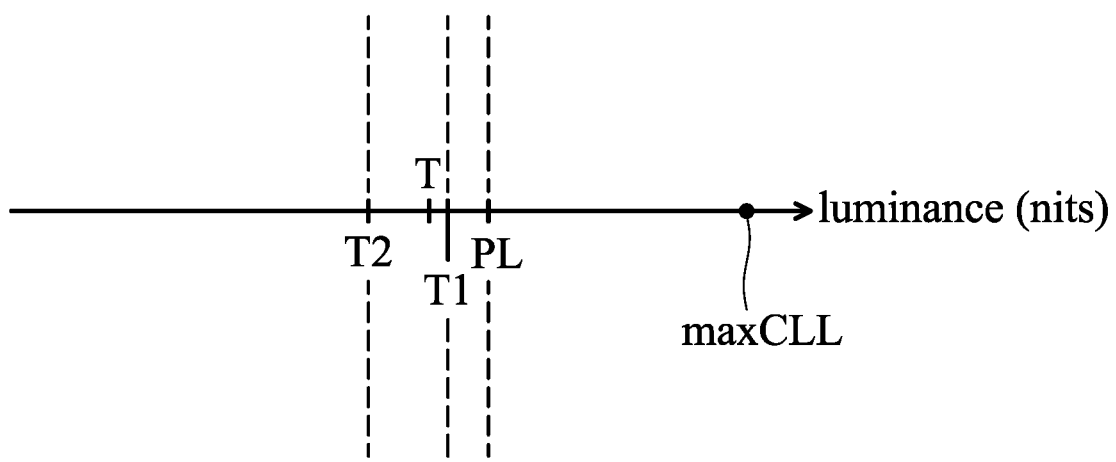

FIGS. 2A and 2B are examples of dynamic tone-mapping in accordance with an embodiment of the invention. Referring to FIG. 2A, the maxCLL (Maximum Content Light Level) parameter in the input HDR video signal is 4000 nits and the display panel has a maximum panel luminance of 500 nits for static tone-mapping. If the first luminance threshold T1 for displaying 100% content of the current frame is 2000 nits, the tone-mapping unit 113 may set a target luminance threshold T that is slightly less than a second luminance threshold T2, where a predetermined percentage of the content of the current frame can be displayed using the second luminance threshold T2. In other words, when the maximum panel luminance PL is less than the second luminance threshold T2, the tone-mapping unit 113 may determine a target luminance threshold T between the second luminance threshold T2 and the maximum panel luminance PL.

In the embodiment, the predetermined percentage, for example, is 95%, but the invention is not limited thereto. For example, the target luminance threshold T may be a weighted sum of the second luminance threshold T2 and the maximum panel luminance PL of the display panel.

Referring to FIG. 2B, the maxCLL parameter in the input HDR video signal is 4000 nits and the display panel has a maximum panel luminance PL of 500 nits for static tone-mapping. If the first luminance threshold T1 for displaying 100% content of the current frame is 300 nits (i.e., less than the maximum panel luminance PL of 500 nits), the tone-mapping unit 113 may set a target luminance threshold T that is between the first luminance threshold T1 and a second luminance threshold T2, where a predetermined percentage of the content of the current frame can be displayed using the second luminance threshold T2. In other words, when the maximum panel luminance PL is greater than the second luminance threshold T2, the tone-mapping unit 113 may determine a target luminance threshold T between the first luminance threshold T1 and the second luminance threshold T2.

In the embodiment, the predetermined percentage, for example, is 95%, but the invention is not limited thereto. For example, the target luminance threshold T may be a weighted sum of the first luminance threshold and the second luminance threshold.

It should be noted that FIGS. 2A and 2B are for purposes of description, and the tone-mapping unit 113 may set various break points and different slopes of the tone-mapping curve within every two neighboring break points for a better tone-mapping result. In addition, the maxCLL parameter is not considered in the embodiments of FIGS. 2A and 2B.

Figure 3A:
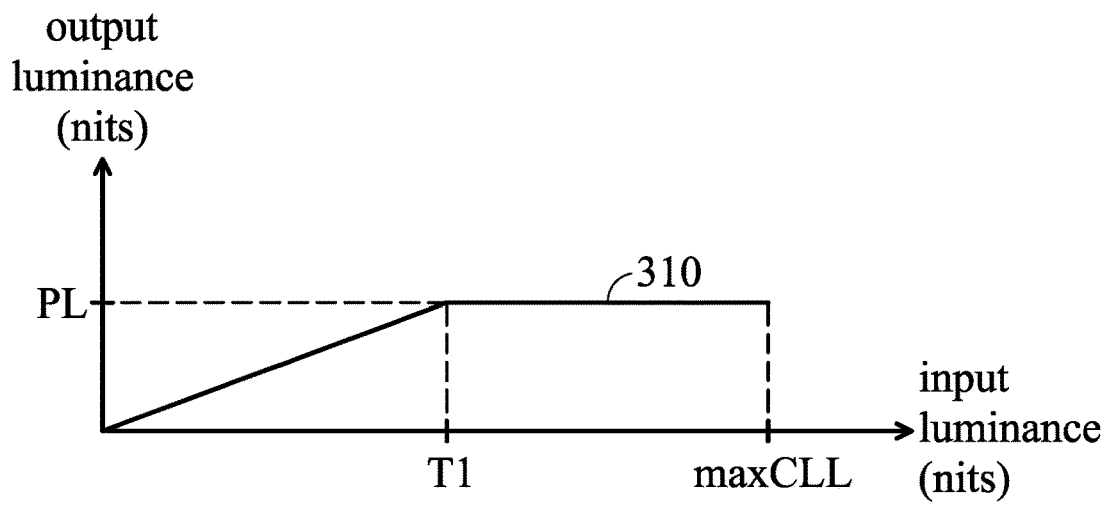
FIGS. 3A and 3B are diagrams of curves for adaptive tone-mapping in accordance with an embodiment of the invention.
Figure 3B:
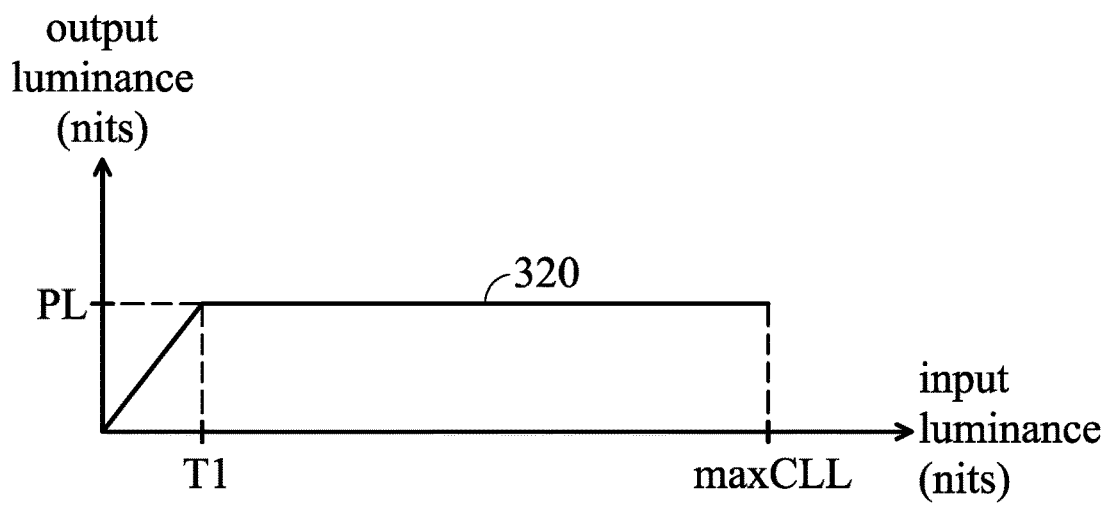

FIGS. 3A and 3B are diagrams of curves for adaptive tone-mapping in accordance with an embodiment of the invention. Referring to FIG. 2A and FIG. 3A, with the conditions defined in FIG. 2A, the curve 310 in FIG. 3A can be used in tone-mapping performed by the tone-mapping unit 113. For example, the tone-mapping curve 310 is approximately linear when the luminance of the linear RGB video signal of the tone-mapping unit 113 is less than the first luminance threshold T1 (i.e., 2000 nits). The output luminance of the is clipped at 500 nits (i.e., the maximum panel luminance PL of the display panel) when the luminance value of the input linear RGB video signal of the tone-mapping unit 113 is larger than or equal to the first luminance threshold T1 (i.e., 2000 nits).

Referring to FIG. 2B and FIG. 3B, with the conditions defined in FIG. 2B, the tone-mapping curve 320 in FIG. 3B can be used in tone-mapping performed by the tone-mapping unit 113. For example, the tone-mapping curve 320 is approximately linear when the luminance of the input linear RGB video signal of the tone-mapping unit 113 is less than the first luminance threshold T1 (i.e., 300 nits), and the output luminance is clipped at 500 nits (i.e., the maximum panel luminance PL of the display panel) when the luminance of the input linear RGB video signal of the tone-mapping unit 113 is larger than or equal to the first luminance threshold T1 (i.e., 300 nits).

Figure 3C:
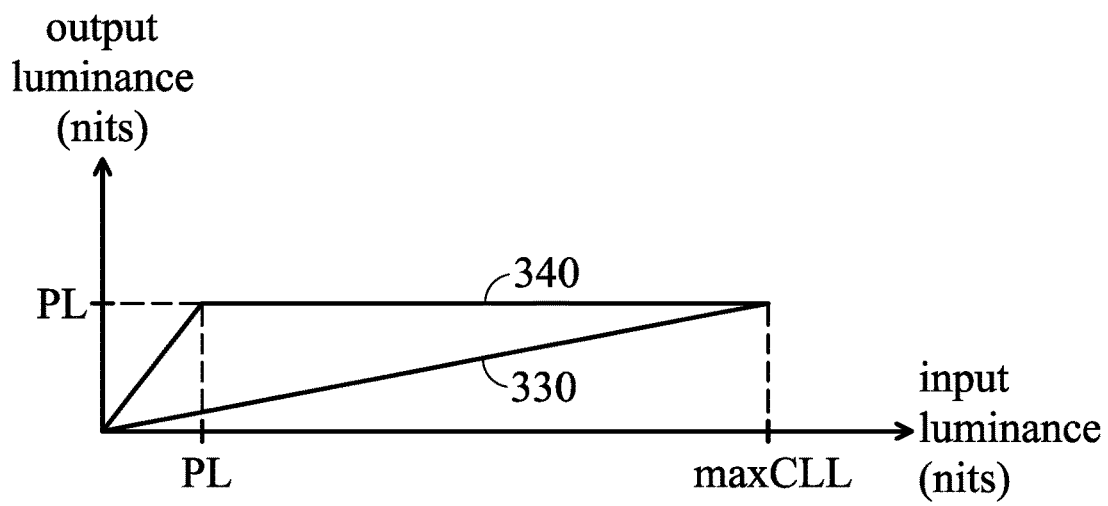
FIG. 3C is a diagram of curves for static tone-mapping.

FIG. 3C is a diagram of curves for static tone-mapping. If static tone-mapping is used, the tone-mapping algorithm can be based on the maximum panel luminance PL of the display panel or the maxCLL parameter of the input HDR video signal. For example, if the tone-mapping algorithm is based on the maxCLL parameter, the tone-mapping curve 330 is used. However, the maxCLL parameter of 4000 nits may indicate that the maximum luminance of the whole video is 4000 nits, and almost each frame in the video may have the maximum luminance much less than the maxCLL of 4000 nits. Thus, if the black content in the video is enhanced, many bright regions in the video will be saturated.

If the tone-mapping algorithm is based on the maximum panel luminance PL of the display panel, the tone-mapping curve 340 is used. However, the output luminance is clipped at 500 nits (i.e., the maximum panel luminance of the display panel) when the luminance of the input linear RGB video signal is larger than or equal to the maximum panel luminance (e.g., 500 nits) of the display panel.

Since the characteristics or the histograms of two adjacent frames may differ a lot, the tone-mapping unit 113 may slowly adjust the tone-mapping curve so as to prevent the video from flickering. For example, a weighted tone-mapping curve using the current tone-mapping curve (i.e., t=n) and the previous tone-mapping curve (i.e., t=n−1) can be used as the tone-mapping curve of the next frame (i.e., t=n+1).

In addition, a scene change may occur between any two adjacent frames of the video signal. Since the calculated histogram from the histogram calculator 116 is delayed by one frame, the tone-mapping unit 113 may detect a scene change of the frames of the linear RGB video signal, and use a special tone-mapping curve upon detection of scene change.

In an embodiment, for an electronic device with a display panel such as a television, a smartphone, or a tablet PC, the maximum panel luminance of the display panel can be adjusted to a larger value, and a wider gamut can be used for a better HDR remapping result. Alternatively, for an electronic device without a display panel such as a Blu-ray player or a video game console, a graphical user interface (GUI) such as a scroll bar can be provided, and the target luminance of the display panel can be adjusted via the scroll bar for a better HDR remapping result. In addition, the default gamut (e.g., BT. 709) for the display panel can be set to a wider gamut such as BT. 2020, Digital Cinema Initiatives (DCI) P3, or other gamuts, but the invention is not limited thereto.

Figure 4:
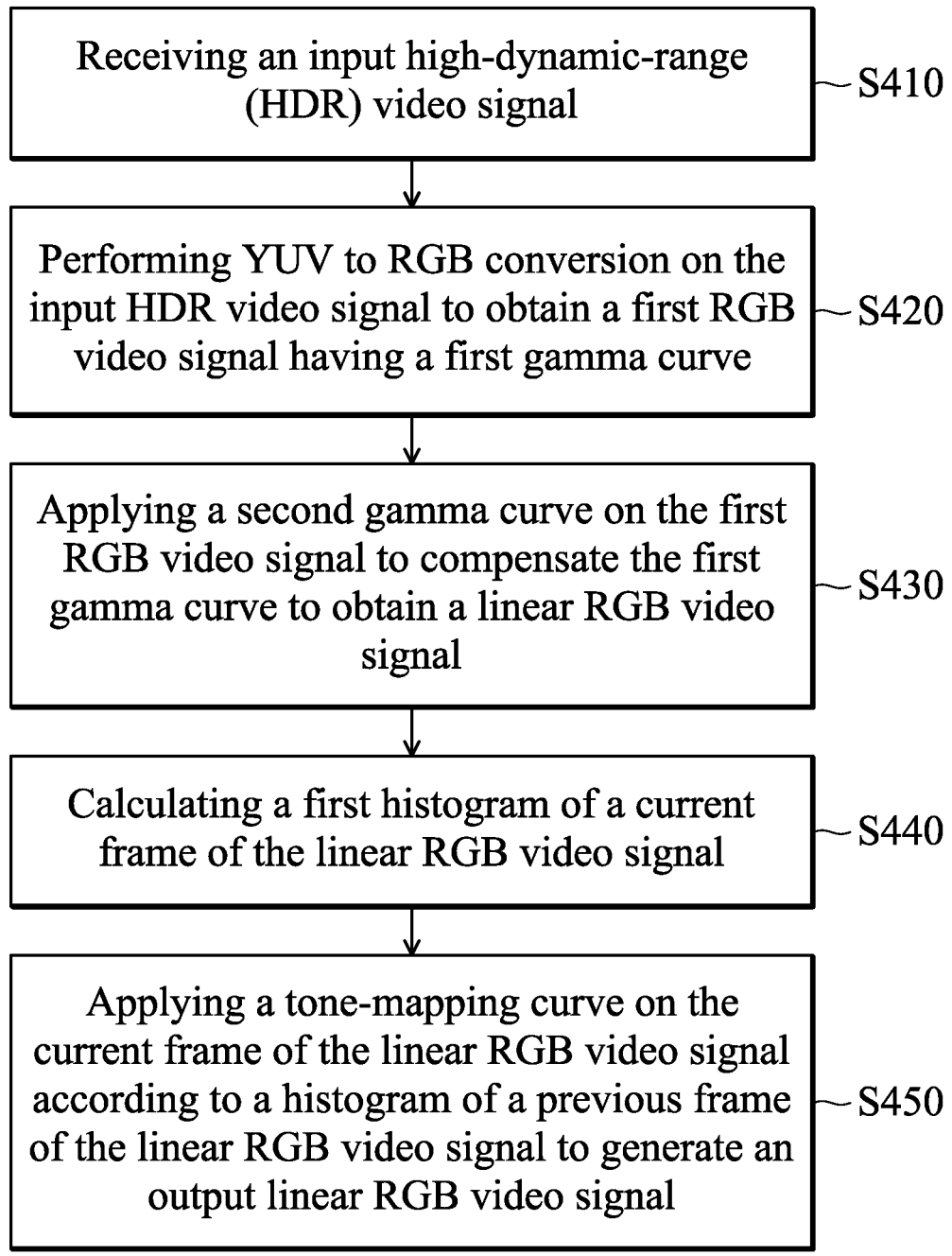
FIG. 4 is a flow chart of a method for performing tone-mapping of high-dynamic-range (HDR) video.

FIG. 4 is a flow chart of a method for performing tone-mapping of high-dynamic-range (HDR) video.

In step S410, an input high-dynamic-range (HDR) video signal is received. For example, the input HDR video signal may comply with the SMPTE ST 2086 standard that has a definition of static metadata.

In step S420, YUV to RGB conversion is performed on the input HDR video signal to obtain a first RGB video signal having a first gamma curve. For example, the conversion matrix for converting YUV components to RGB components may include information of a first gamma curve.

In step S430, a second gamma curve is applied on the first RGB video signal to compensate the first gamma curve to obtain a linear RGB video signal. In order to perform tone-mapping in the following step, a linear RGB video signal is required, and the second gamma curve can be regarded as an inverse curve of the first gamma curve. Thus, the first gamma curve can be compensated in step S430.

In step S440, a first histogram of each frame of the linear RGB video signal is calculated. For example, the histogram calculator 116 may repeatedly calculate the histogram of each frame of the linear RGB video signal, and the first histogram is based on the absolute luminance values (i.e., no gamma) of pixels in the current frame of the linear RGB video signal.

In step S450, a tone-mapping curve is applied on the current frame of the linear RGB video signal according to the first histogram of a previous frame of the linear RGB video signal to generate an output linear RGB video signal. For example, the output linear RGB video signal may be an SDR video signal.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

In view of the above, a video controller and a method for performing tone-mapping on an HDR video are provided. The video controller and the method are capable of applying different tone-mapping curve for each frame of the input HDR video signal in the linear domain (i.e. without gamma) with the static metadata of the input HDR video signal to obtain an SDR video signal. In addition, the contrasts of various regions in the SDR video signal can be enhanced via local-contrast enhancement, and thus achieving a better video quality of the output SDR video signal.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures.

As used in any implementation described herein, the term "unit" may refer to a "component" or to a "logic unit", as these terms are described below. Accordingly, the term "unit" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

In addition, any one or more of the blocks of the processes described herein may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more operations in response to instructions conveyed to the processor by a computer readable medium.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video controller, comprising:
   a color-space converter, arranged to receive an input high-dynamic-range (HDR) video signal and perform a color space conversion on the input HDR video signal to obtain a first video signal having a first gamma curve;
   a de-gamma unit, arranged to apply a second gamma curve on the first video signal to compensate for the first gamma curve to obtain a second video signal;
   a first histogram calculator, arranged to calculate a first histogram of a current frame of the second video signal; and
   a tone-mapping unit, arranged to apply a tone-mapping curve on the current frame of the second video signal according to the first histogram of a previous frame of the second video signal to generate an output video signal.

2. The video controller as claimed in claim 1, wherein the color space conversion is a YUV to RGB conversion, and the first video signal is an RGB video signal.

3. The video controller as claimed in claim 2, wherein the second video signal and the output video signal are linear RGB video signals.

4. The video controller as claimed in claim 1, further comprising:
   a gamut-mapping unit, arranged to map a first gamut of the second video signal to a second gamut, wherein the first gamut is wider than the second gamut.

5. The video controller as claimed in claim 1, wherein the video controller is electrically connected to a display panel having a maximum panel luminance, and the tone-mapping unit further determines a first luminance threshold for displaying 100% of the content of the current frame, and a second luminance threshold that is used for displaying a predetermined percentage of the content of the current frame.

6. The video controller as claimed in claim 5, wherein when the maximum panel luminance is less than the second luminance threshold, the tone-mapping unit determines a target luminance threshold between the second luminance threshold and the maximum panel luminance, wherein the tone-mapping curve is linear when luminance values of the current frame of the second video signal are less than the target luminance threshold.

7. The video controller as claimed in claim 5, wherein when the maximum panel luminance is greater than the first threshold, the tone-mapping unit determines a target luminance threshold between the first luminance threshold and the second luminance threshold, wherein the tone-mapping curve is linear when a luminance value of the current frame of the second video signal is less than the target luminance threshold.

8. The video controller as claimed in claim 5, wherein output luminance values of the output video signal are clipped at the maximum panel luminance when the luminance values of the current frame of the second video signal is greater than or equal to the first luminance threshold.

9. The video controller as claimed in claim 1, wherein the tone-mapping unit calculates the tone-mapping curve for a next frame of the second video signal by a temporal filter using the tone-mapping curves of the previous frame and the current frame.

10. The video controller as claimed in claim 1, wherein the tone-mapping unit further detects a scene change within the second video signal, and determines a specific tone-mapping curve for the current frame upon detection of a scene change between the previous frame and the current frame.

11. The video controller as claimed in claim 1, further comprising:
a gamma unit, arranged to apply a third gamma curve to the output video signal to generate a third video signal;
a second color-space converter, arranged to perform YUV to RGB conversion on the third RGB video signal to obtain a standard-dynamic-range (SDR) video signal;
a second histogram calculator, arranged to calculate second histograms of a plurality of regions in the current frame of the SDR video signal; and
a local-contrast enhancement unit, arranged to enhance contrast values of the regions in each frame of the SDR video signal to generate an output SDR video signal based on the second histograms of the regions of the previous frame of the SDR video signal.

12. The video controller as claimed in claim 11, wherein the local-contrast enhancement unit applies stronger contrast enhancement in dark regions of the current frame, and applies weaker contrast enhancement in bright regions of the current frame.

13. A method for performing tone-mapping of high-dynamic-range (HDR) video, comprising:
receiving an input high-dynamic-range (HDR) video signal;
performing YUV to RGB conversion on the input HDR video signal to obtain a first RGB video signal having a first gamma curve;
applying a second gamma curve on the first RGB video signal to compensate the first gamma curve to obtain a linear RGB video signal;
calculating a first histogram of a current frame of the linear RGB video signal; and
applying a tone-mapping curve on the current frame of the linear RGB video signal according to the first histogram of a previous frame of the linear RGB video signal to generate an output linear RGB video signal.

14. The method as claimed in claim 13, further comprising:
mapping a first gamut of the linear RGB video signal to a second gamut, wherein the first gamut is wider than the second gamut.

15. The method as claimed in claim 13, wherein a display panel having a maximum panel luminance is used to display an output SDR video signal generated from the output linear RGB video signal, and the method further comprises:
determining a first luminance threshold for displaying 100% of the content of the current frame, and a second luminance threshold that is used for displaying a predetermined percentage of the content of the current frame.

16. The method as claimed in claim 15, further comprising:
when the maximum panel luminance is less than the second luminance threshold, determining a target luminance threshold between the second luminance threshold and the maximum panel luminance, wherein the tone-mapping curve is linear when luminance values of the current frame of the linear RGB video signal are less than the target luminance threshold.

17. The method as claimed in claim 15, further comprising:
when the maximum panel luminance is greater than the first threshold, determining a target luminance threshold between the first luminance threshold and the second luminance threshold, wherein the tone-mapping curve is linear when luminance values of the current frame of the linear RGB video signal is less than the target luminance threshold.

18. The method as claimed in claim 15, wherein output luminance values of the output linear RGB video signal are clipped at the maximum panel luminance when the luminance values of the current of the linear RGB video signal is greater than or equal to the first luminance threshold.

19. The method as claimed in claim 13, further comprising:
calculating the tone-mapping curve for a next frame of the linear RGB video signal by a temporal filter using the tone-mapping curves of the previous frame and the current frame.

20. The method as claimed in claim 13, further comprising:
detecting a scene change within the linear RGB video signal; and
determining a specific tone-mapping curve for the current frame upon detecting a scene change between the previous frame and the current frame.

21. The method as claimed in claim 13, further comprising:
applying a third gamma curve to the output linear RGB video signal to generate a second RGB video signal;
performing YUV to RGB conversion on the second RGB video signal to obtain a standard-dynamic-range (SDR) video signal;
calculating second histograms of a plurality of regions in the current frame of the SDR video signal; and
enhancing contrast values of the regions in the current frame of the SDR video signal to generate an output SDR video signal based on the second histograms of the regions of the previous frame of the SDR video signal.

22. The method as claimed in claim 21, further comprising:
applying stronger contrast enhancement in dark regions of the current frame of the current frame of the SDR video signal; and
applying weaker contrast enhancement in bright regions of the current frame of the current frame of the SDR video signal.

* * * * *